(12) United States Patent
Papasakellariou et al.

(10) Patent No.: US 9,510,366 B2
(45) Date of Patent: Nov. 29, 2016

(54) INDEXING RESOURCES FOR TRANSMISSION OF ACKNOWLEDGEMENT SIGNALS IN MULTI-CELL TDD COMMUNICATION SYSTEMS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 12 days.

(21) Appl. No.: 14/172,504

(22) Filed: Feb. 4, 2014

(65) Prior Publication Data

US 2014/0153492 A1   Jun. 5, 2014

Related U.S. Application Data

(63) Continuation of application No. 13/077,046, filed on Mar. 31, 2011, now Pat. No. 8,644,199.

(60) Provisional application No. 61/319,524, filed on Mar. 31, 2010.

(51) Int. Cl.
*H04W 72/12*   (2009.01)
*H04L 5/00*   (2006.01)
(Continued)

(52) U.S. Cl.
CPC ........ *H04W 72/1289* (2013.01); *H04L 1/1861* (2013.01); *H04L 5/001* (2013.01); *H04L 5/0042* (2013.01); *H04L 5/0053* (2013.01); *H04L 5/0055* (2013.01); *H04L 5/0094* (2013.01); *H04W 52/04* (2013.01); *H04L 1/1812* (2013.01)

(58) Field of Classification Search
USPC .................. 370/280, 318, 431, 329; 455/450
See application file for complete search history.

(56) References Cited

U.S. PATENT DOCUMENTS 8,892,151 B2    11/2014   Cho et al.
2009/0034465 A1   2/2009   Papasakellariou et al.
2009/0046646 A1   2/2009   Cho et al.
(Continued)

FOREIGN PATENT DOCUMENTS

CN    101511121    8/2009
CN    101646234    2/2010
(Continued)

OTHER PUBLICATIONS

LTE; Evolved Universal Terrestrial Radio Access (E-UTRA); Physical layer procedures (3GPP TS 36.213 version 8.8.0 Release 8).*

(Continued)

*Primary Examiner* — Hassan Kizou
*Assistant Examiner* — Deepa Belur
(74) *Attorney, Agent, or Firm* — The Farrell Law Firm, P.C.

(57) ABSTRACT

Methods and apparatus are described for a User Equipment (UE) to determine a set of resources available for transmitting an acknowledgement signal in an UpLink (UL) Component Carrier (CC) in response to reception of multiple DownLink (DL) Scheduling Assignments (SAs) transmitted from a base station with each DL SA being associated with a respective DL CC. The UL CC and a first DL CC establish a communication link when the UE is configured for communication over a single UL CC and a single DL CC.

20 Claims, 17 Drawing Sheets

(51) Int. Cl.
*H04W 52/04* (2009.01)
*H04L 1/18* (2006.01)

(56) References Cited

U.S. PATENT DOCUMENTS

| | | | |
|---|---|---|---|
| 2009/0245194 A1* | 10/2009 | Damnjanovic et al. | 370/329 |
| 2009/0268685 A1 | 10/2009 | Chen et al. | |
| 2009/0303956 A1 | 12/2009 | Chen et al. | |
| 2009/0307560 A1* | 12/2009 | Seki | 714/749 |
| 2009/0323617 A1* | 12/2009 | Che et al. | 370/329 |
| 2010/0113004 A1* | 5/2010 | Cave | H04W 52/365 455/422.1 |
| 2010/0165939 A1* | 7/2010 | Lin | 370/329 |
| 2010/0195587 A1* | 8/2010 | Ratasuk et al. | 370/329 |
| 2010/0195624 A1* | 8/2010 | Zhang et al. | 370/335 |
| 2010/0226290 A1 | 9/2010 | Kwak et al. | |
| 2010/0260135 A1* | 10/2010 | Fan et al. | 370/329 |
| 2011/0002276 A1* | 1/2011 | Chen et al. | 370/329 |
| 2011/0122825 A1* | 5/2011 | Lee | H04J 11/0069 370/328 |
| 2011/0142075 A1* | 6/2011 | Che et al. | 370/476 |
| 2011/0165906 A1* | 7/2011 | Papasakellariou | H04L 1/1692 455/522 |
| 2011/0216657 A1 | 9/2011 | Wu et al. | |
| 2011/0310856 A1* | 12/2011 | Hariharan et al. | 370/336 |
| 2012/0002631 A1 | 1/2012 | Nishio et al. | |
| 2012/0087324 A1 | 4/2012 | Kiyoshima et al. | |
| 2012/0093097 A1* | 4/2012 | Che et al. | 370/329 |
| 2012/0207107 A1* | 8/2012 | Li | H04W 52/58 370/329 |
| 2012/0236812 A1* | 9/2012 | Chen | H04L 1/1685 370/329 |
| 2012/0294204 A1* | 11/2012 | Chen et al. | 370/280 |
| 2012/0314674 A1* | 12/2012 | Seo et al. | 370/329 |
| 2013/0176982 A1* | 7/2013 | Han | H04L 1/1861 370/329 |
| 2013/0215875 A1* | 8/2013 | Yang et al. | 370/336 |
| 2013/0223301 A1* | 8/2013 | Lee | H04L 5/0055 370/281 |
| 2013/0301503 A1* | 11/2013 | Park | H04W 76/048 370/311 |
| 2014/0044092 A1* | 2/2014 | Guan | H04L 1/1854 370/330 |
| 2014/0269452 A1* | 9/2014 | Papasakellariou | H04B 7/2643 370/280 |
| 2015/0003425 A1* | 1/2015 | Kim et al. | 370/336 |
| 2015/0173065 A1* | 6/2015 | Fu | H04L 1/1861 370/280 |

FOREIGN PATENT DOCUMENTS

| | | | |
|---|---|---|---|
| CN | 101657018 | 2/2010 | |
| EP | 2204937 | 7/2010 | |
| EP | 2204937 A1 * | 7/2010 | ............... H04L 5/00 |
| EP | 2 343 932 | 7/2011 | |
| JP | 2010158000 | 7/2010 | |
| JP | 2010158000 A * | 7/2010 | |
| KR | 1020090016375 | 2/2009 | |
| WO | WO 2009/045047 | 4/2009 | |
| WO | WO 2010/013963 | 2/2010 | |
| WO | WO 2010/019522 | 2/2010 | |
| WO | WO 2010/106786 | 9/2010 | |
| WO | WO 2011/041445 | 4/2011 | |

OTHER PUBLICATIONS

LG Electronics, "Details on Mode 1 and Mode a for TDD ACK-NACK Feedback in Rel-10", R1-110388, 3GPP TSG RAN WG1 Meeting #63bis, Jan. 17-21, 2011.
Samsung, "PUCCH HARQ-ACK Resource Indexing for DL CA", R1-103002, 3GPP TSG RAN WG1 # 61, May 10-14, 2010.
Huawei, "PUCCH Design for Carrier Aggregation", R1-093046, 3GPP TSG RAN WG1 Meeting #58, Aug. 2009.
ZTE, "ACK/NACK Design for LTE-Advanced", R1-093208, TSG-RAN WG1 #58, Aug. 2009.
NEC Group, "PDCCH Structure for LTE-Advanced System", R1-091692, TSG-RAN WG1#57, May 2009.
CATT, "Benefits of PDCCH Active Component Carrier Set for UL Control Channel", R1-094539, 3GPP TSG RAN WG1 Meeting #59, Nov. 2009.
Samsung: "UL HARQ-ACK Signal Transmission in Rel-10", R1-101146, 3GPP TSG RAN WG1 Meeting #60, Feb. 22, 2010.
Samsung: "DAI Design for LTE-A TDD", R1-101143, 3GPP TSG RAN WG1 meeting #60, Feb. 22, 2010.
Japanese Office Action dated Nov. 25, 2014 issued in counterpart application No. 2013-502480.
Yeongmoon Son et al., "Modification on AAI_TRF_IND-REQ/RSP (Section 152.16.3.1),", IEEE 802.16 Broadband Wireless Access Working Group, Jan. 13, 2010, 6 pages.
Motorola Mobility, "Corrections to Rel-10 LTE-Advanced features in 36.213", R1-111216, 3GPP TSG-RAN Meeting #64, Feb. 21-25, 2011, 111 pages.
CATT, "UL ACK/NACK Transmission Design in FDD with CA", R1-100876, 3GPP TSG RAN WG1 Meeting #60, Feb. 22-26, 2010, 5 pages.
Samsung, "PUCCH HARQ-ACK Resource Indexing for DL CA", R1-102171, Apr. 12-16, 2010, 5 pages.
Japanese Office Action dated Nov. 30, 2015 issued in counterpart application No. 2015-063188, 9 pages.

* cited by examiner

INDEXING RESOURCES FOR TRANSMISSION OF ACKNOWLEDGEMENT SIGNALS IN MULTI-CELL TDD COMMUNICATION SYSTEMS

PRIORITY

This application is a Continuation Application of U.S. patent application Ser. No. 13/077,046, now U.S. Pat. No. 8,644,199, which was filed in the U.S. Patent and Trademark Office on Mar. 31, 2011, which claims priority under 35 U.S.C. §119(e) to U.S. Provisional Application No. 61/319,524, which was filed on Mar. 31, 2010, the entire content of each of which is incorporated herein by reference.

BACKGROUND OF THE INVENTION

1. Field of the Invention

The present invention is directed generally to wireless communication systems and, more specifically, to the transmission of acknowledgement signals in an UpLink (UL) of a communication system using time division multiplexing (TDM).

2. Description of the Art

A communication system includes a DownLink (DL), conveying transmissions of signals from a Base Station (BS or NodeB) to User Equipments (UEs), and the UL, conveying transmissions of signals from UEs to the NodeB. A UE, also commonly referred to as a terminal or a mobile station, may be fixed or mobile, such as a wireless device, a cellular phone, a personal computer device, etc. A NodeB is generally a fixed station and may also be referred to as a Base Transceiver System (BTS), an access point, or some other similar terminology.

The UL supports transmissions of data signals carrying information content, control signals providing information associated with the transmission of data signals in the DL, and Reference Signals (RSs), which are also commonly referred to as pilot signals. The DL also supports transmissions of data signals, control signals, and RSs.

UL data signals are conveyed through a Physical Uplink Shared CHannel (PUSCH). DL data channels are conveyed through a Physical Downlink Shared CHannel (PDSCH). In the absence of PUSCH transmission, a UE conveys Uplink Control Information (UCI) through a Physical Uplink Control CHannel (PUCCH). In the presence of PUSCH transmission, a UE may convey UCI together with data information through the PUSCH.

DL control signals may be of broadcast or UE-specific nature. UE-specific control signals can be used, for example, to provide Scheduling Assignments (SAs) to a UE for PDSCH reception (DL SAs) or PUSCH transmission (UL SAs). The NodeB transmits an SA using a Physical Downlink Control CHannel (PDCCH).

UL control signals include ACKnowledgement signals associated with a Hybrid Automatic Repeat reQuest (HARD) process (HARQ-ACK signals) and are typically transmitted in response to PDSCH receptions.

FIG. 1 illustrates a conventional PUCCH structure for HARQ-ACK signal transmission in a Transmission Time Interval (TTI), which consists of one sub-frame.

Referring to FIG. 1, a sub-frame 110 includes two slots 120. Each slot 120 includes $N_{symb}^{UL}$, symbols for transmitting HARQ-ACK signals 130 and RSs 140, which enable coherent demodulation of the HARQ-ACK signals. Each symbol further includes a Cyclic Prefix (CP) to mitigate interference due to channel propagation effects. The transmission in the first slot may be at a different part of an operating BandWidth (BW) than in the second slot in order to provide frequency diversity. The operating BW includes frequency resource units that are referred to as Physical Resource Blocks (PRBs). Each PRB includes $N_{sc}^{RB}$ subcarriers, or Resource Elements (REs), and a UE transmits HARQ-ACK signals and RSs over one PRB 150.

FIG. 2 illustrates the HARQ-ACK signal transmission in a sub-frame slot for the PUCCH structure in FIG. 1.

Referring to FIG. 2, b HARQ-ACK bits 210 modulate a Constant Amplitude Zero Auto-Correlation (CAZAC) sequence 230 in modulators 220, for example, using Binary Phase Shift Keying (BPSK) or Quadrature Phase Shift Keying (QPSK) modulation. The modulated CAZAC sequence is then transmitted after performing an Inverse Fast Fourier Transform (IFFT). Each RS is transmitted through the non-modulated CAZAC sequence after performing an IFFT 240.

FIG. 3 illustrates a transmitter block diagram for the PUCCH structure in FIG. 1.

Referring to FIG. 3, the HARQ-ACK information modulates a CAZAC sequence 310 which, without modulation, is also used for the RS. A controller 320 selects the first and second PRBs for transmission of the CAZAC sequence in the first and second slots of the PUCCH sub-frame and controls a sub-carrier mapper 330. The sub-carrier mapper 330 maps the first and second PRBs to the CAZAC sequence according to the control signal from the controller 320, respectively, an IFFT 340 performs IFFT, and a Cyclic Shift (CS) mapper 350 cyclically shifts the output of the IFFT 340. Finally, the CP inserter 360 inserts a CP to the signal output by the CS MAPPER 350, and a filter 370 performs time windowing to generate a transmitted signal 380. A UE is assumed to apply zero padding in REs that are not used for its signal transmission and in guard REs (not shown). Moreover, for brevity, additional transmitter circuitry such as digital-to-analog converter, analog filters, amplifiers, and transmitter antennas as they are known in the art, are not shown.

FIG. 4 illustrates a receiver block diagram for the PUCCH structure in FIG. 1.

Referring to FIG. 4, an antenna receives an analog signal and after passing through further processing units, e.g., filters, amplifiers, frequency down-converters, and analog-to-digital converters (not shown) a digital received signal 410 is then filtered by a filter 420 and the CP is removed by a CP remover 430. Subsequently, the CS is restored by CS demapper 440, a Fast Fourier Transform (FFT) is applied by FFT 450, a controller 465 selects the first and second PRBs of the signal transmission in the first slot and second slots, respectively, and controls a sub-carrier demapper 460. The sub-carrier demapper 460 demaps the first and second PRBs according to the control signal from the controller 465, and the signal is correlated by multiplier 470 with a replica of the CAZAC sequence 480. The output 490 can then be passed to a channel estimation unit, such as a time-frequency interpolator, for an RS, or to a detection unit for the CAZAC sequence modulated by HARQ-ACK bits.

Different CSs of the same CAZAC sequence provide orthogonal CAZAC sequences and can be allocated to different UEs to achieve orthogonal multiplexing of HARQ-ACK signal transmissions in the same PRB. If $T_s$ is the symbol duration, a number of such CSs is approximately $\lfloor T_s/D \rfloor$, where D is the channel propagation delay spread, and $\lfloor\ \rfloor$ is the floor function which rounds a number to its immediately lower integer.

In addition to orthogonal multiplexing of HARQ-ACK signals from different UEs in the same PRB using different CSs of a CAZAC sequence, orthogonal multiplexing can also be achieved in the time domain using Orthogonal Covering Codes (OCC).

For example, in FIG. 2, the HARQ-ACK signal can be modulated by a length-4 OCC, such as a Walsh-Hadamard (WH) OCC, while the RS can be modulated by a length-3 OCC, such as a DFT OCC (not shown). Accordingly, the multiplexing capacity is increased by a factor of 3 (determined by the OCC with the smaller length). The sets of WH OCCs, $\{w_0, w_1, w_2, w_3\}$, and DFT OCCs, $\{D_0, D_1, D_2\}$, are respectively $$\begin{bmatrix} w_0 \\ w_1 \\ w_2 \\ w_3 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

and $$\begin{bmatrix} D_0 \\ D_1 \\ D_2 \end{bmatrix} = \begin{bmatrix} 1 & 1 & 1 \\ 1 & e^{-j2\pi/3} & e^{-j4\pi/3} \\ 1 & e^{-j4\pi/3} & e^{-j2\pi/3} \end{bmatrix}.$$

Table 1 presents a mapping for the PUCCH resource $n_{PUCCH}$ used for HARQ-ACK signal and RS transmission to an OCC $n_{oc}$ and a CS α assuming 6 CS per symbol and a length-3 OCC. If all resources within a reference PUCCH PRB are used, the resources in the next PRB immediately following the reference PUCCH PRB can be used.

TABLE 1

PUCCH Resource Mapping to OCC and CS.

| CS α | OCC $n_{oc}$ for HARQ-ACK and for RS | | |
|---|---|---|---|
| | $W_0, D_0$ | $W_1, D_1$ | $W_3, D_2$ |
| 0 | $n_{PUCCH} = 0$ | | $n_{PUCCH} = 6$ |
| 1 | | $n_{PUCCH} = 3$ | |
| 2 | $n_{PUCCH} = 1$ | | $n_{PUCCH} = 7$ |
| 3 | | $n_{PUCCH} = 4$ | |
| 4 | $n_{PUCCH} = 2$ | | $n_{PUCCH} = 8$ |
| 5 | | $n_{PUCCH} = 5$ | |

The SAs in the PDCCH are transmitted in elementary units that are referred to as Control Channel Elements (CCEs). Orthogonal Frequency Division Multiplexing (OFDM) is assumed as the DL transmission method. Each CCE includes a number of REs and the UEs are informed of the total number of CCEs, $N_{CCE}$, in a DL sub-frame through the transmission of a Physical Control Format Indicator CHannel (PCFICH) by the NodeB. The PCFICH indicates the number of OFDM symbols used for the PDCCH transmission in the respective DL sub-frame.

For a Frequency Division Duplex (FDD) system, the UE determines $n_{PUCCH}$ as $n_{PUCCH} = n_{CCE} + N_{PUCCH}$, where $n_{CCE}$ is the first CCE of the respective DL SA and $N_{PUCCH}$ is an offset configured by higher layers, such as a Radio Resource Control (RRC) layer, and can be informed to UEs through a DL broadcast channel.

A one-to-one mapping can exist between the PUCCH resources (PRB, CS, OCC) for HARQ-ACK signal transmission and the CCEs of the respective DL SA transmission. For example, if a single resource is used for HARQ-ACK signal transmission, the single resource may correspond to the CCE with the lowest index for the respective DL SA.

FIG. 5 illustrates a transmission of DL SAs using CCEs in respective PDCCHs.

Referring to FIG. 5, a DL SA for UE1 uses CCEs 501, 502, 503, and 504, a DL SA for UE2 uses CCEs 511 and 512, a DL SA for UE3 uses CCEs 521 and 522, and a DL SA for UE4 uses CCE 531. After cell-specific bit scrambling, modulation, and mapping to DL REs 540, each DL SA is transmitted in a PDCCH 550. Thereafter, UE1, UE2, UE3, and UE4 can use respectively $n_{PUCCH}=0$, $n_{PUCCH}=4$, $n_{PUCCH}=6$, and $n_{PUCCH}=8$ for their HARQ-ACK signal transmissions. Alternatively, if multiple CCEs are used to transmit a DL SA, HARQ-ACK information may be conveyed by the modulated HARQ-ACK signal and also by the selected PUCCH resource.

For a Time Division Duplex (TDD) system, multiple DL sub-frames may be linked to a single UL sub-frame in the sense that HARQ-ACK signal transmissions from UEs in response to DL SA receptions in these multiple DL sub-frames will occur in the same UL sub-frame. This set of DL sub-frames will be referred to as bundling window. To avoid having to always provision for the maximum PUCCH HARQ-ACK resources by always assuming the maximum PDCCH size in each DL sub-frame in the bundling window, the PUCCH resource indexing for HARQ-ACK signal transmission may exploit possible variations in the PDCCH size among DL sub-frames.

Denoting the number of DL sub-frames in the bundling window by M, the DL sub-frame index by m=0, 1, . . . , M-1, the number of CCEs for a PCFICH value of p($N_0$=0) by $N_p$, and the first DL SA CCE in sub-frame m by $n_{CCE}$ (m), a PUCCH resource indexing for HARQ-ACK signal transmission can be as described below. The UE first selects a value p∈{0, 1, 2, 3} providing $N_p \leq n_{CCE}(m) < N_{p+1}$ and uses $n_{PUCCH} = (M-m-1) \times N_p + m \times N_{p+1} + n_{CCE}(m) + N_{PUCCH}$ as the PUCCH resource for HARQ-ACK signal transmission in response to DL SA reception in DL sub-frame m, where $N_p = \max\{0, \lfloor [N_{RB}^{DL} \times (N_{sc}^{RB} \times p - 4)]/36 \rfloor\}$, $N_{RB}^{DL}$ is the number of PRBs in the DL operating BW, and a CCE includes 36 REs.

The above indexing is based on interleaving the blocks of PUCCH resources for HARQ-ACK signal transmissions in an UL sub-frame that are linked to blocks of CCEs located in the first, second, or third PDCCH OFDM symbol in respective DL sub-frames. Interleaving, instead of serial concatenation of HARQ-ACK resources assuming the maximum PDCCH size in each DL sub-frame, allows for savings in the PUCCH resources for HARQ-ACK signal transmissions, when the PDCCH size in some DL sub-frames is not the maximum.

FIG. 6 illustrates block interleaving of PUCCH resources when there are 3 DL sub-frames in a bundling window.

Referring to FIG. 6, the PDCCH size is one OFDM symbol in the first DL sub-frame 610, three OFDM symbols in the second DL sub-frame 620, and two OFDM symbols in the third DL sub-frame 630. A total of $3N_1$ PUCCH resources 640 are first reserved for the first PDCCH OFDM symbol for each of the three DL sub-frames 640A, 640B, and 640C. Subsequently, a total of $2N_2$ PUCCH resources 650 are reserved for the second PDCCH OFDM symbol of the second 650B and third 650C DL sub-frames. Finally, $N_3$ PUCCH resources 660 are reserved for the third PDCCH OFDM symbol of the second 660B DL sub-frame.

In order to increase the supportable data rates in a communication system, aggregation of multiple Component Carriers (CCs) is considered in both the DL and the UL to provide higher operating BWs. For example, to support communication over 60 MHz, Carrier Aggregation (CA) of three 20 MHz CCs can be used. A PDSCH reception in a DL CC is scheduled by a respective DL SA that is transmitted as illustrated in FIG. 5.

The transmission of HARQ-ACK signals associated with PDSCH receptions in multiple DL CCs can be in the PUCCH of a single UL CC, which will be referred to as a UL Primary CC (UL PCC) and can be UE-specific. Separate resources can be RRC configured in the UL PCC for HARQ-ACK signal transmissions in response to DL SA receptions in multiple DL CCs.

FIG. 7 is a diagram illustrating resource allocation in an UL CC for HARQ-ACK signal transmissions corresponding to DL SAs received in 3 DL CCs.

Referring to FIG. 7, the HARQ-ACK signal transmissions corresponding to PDSCH receptions in 3 DL CCs, DL CC1 710, DL CC2 720, and DL CC3 730, occur in the UL PCC 740. The resources for HARQ-ACK signal transmission corresponding to DL SA receptions in DL CC1, DL CC2, and DL CC3 are respectively in a first set 750, second set 760, and third set 770 of PUCCH resources.

If the provisioned PUCCH resources for HARQ-ACK signal transmissions consider the maximum number of PDCCH CCEs, the resulting overhead can be substantial. As a UE receiving PDCCH in a subset of DL CCs may not know the PDCCH size in other DL CCs, it may not know the number of respective PUCCH resources. Consequently, the maximum number of PUCCH resources, corresponding to the maximum number of PDCCH CCEs in each DL CC, is assumed. If less than the maximum of PUCCH resources are used in a sub-frame, the remaining PUCCH resources cannot typically be utilized for other transmissions, resulting in BW waste.

In addition to the PUCCH structure in FIG. 1, another PUCCH structure for HARQ-ACK signal transmission in response to DL SA receptions in multiple DL sub-frames (TDD) and/or in multiple DL CCs (CA) jointly codes the $O_{HARQ-ACK}$ HARQ-ACK information bits using, for example, a block code such as the (32, $O_{HARQ-ACK}$) Reed-Mueller (RM) code.

FIG. 8 is a diagram illustrating a conventional PUCCH structure in one sub-frame slot using DFT Spread OFDM (DFT-S-OFDM) for the HARQ-ACK signal transmission.

Referring to FIG. 8, after encoding and modulation, using respectively, for example, a (32, $O_{HARQ-ACK}$) RM block code punctured to a (24, $O_{HARQ-ACK}$) RM code and QPSK modulation (not shown), a set of the same HARQ-ACK bits 810 is multiplied by a multiplier 820 with elements of an OCC 830 and is subsequently DFT precoded 840. For example, for 5 DFT-S-OFDM symbols per slot used for HARQ-ACK signal transmission, the OCC has a length of 5 and can be either {1, 1, 1, 1, 1}, or {1, exp(j2π/5), exp(j4π/5), exp(j6π/5), exp(j8π/5)}, or {1, exp(j4π/5), exp(j8π/5), exp(j2π/5), exp(j6π/5)}, or {1, exp(j6π/5), exp(j2π/5), exp(j8π/5), exp(j4π/5)}, or {1, exp(j8π/5), exp(j6π/5), exp(j4π/5), exp(j2π/5)}.

The output is passed through an IFFT 850 and is then mapped to a DFT-S-OFDM symbol 860. As the previous operations are linear, their relative order may be interchanged. Because the HARQ-ACK signal transmission in the PUCCH is assumed to be in one PRB, which includes $N_{sc}^{RB}=12$ REs, 24 encoded HARQ-ACK bits are transmitted in each slot with QPSK modulation (12 QPSK symbols). The same or different HARQ-ACK bits may be transmitted in the second slot of the sub-frame. RSs are also transmitted in each slot using a CAZAC sequence 870, as previously described, to enable coherent demodulation of the HARQ-ACK signals.

FIG. 9 illustrates a UE transmitter block diagram for the PUCCH structure in FIG. 8.

Referring to FIG. 9, HARQ-ACK bits 905 are encoded and modulated by an encoder/modulator 910 and then multiplied by multiplier 920 with an element of the OCC 925 for the respective DFT-S-OFDM symbol. After DFT precoding by DFT 930, controller 950 selects the REs of the assigned PUCCH PRB and the sub-carrier mapper 940 maps the REs according to the control signal from the controller 950. IFFT is performed by IFFT 960 and a CP inserter 970 and a filter 980 insert a CP and filter the transmitted signal 990, respectively.

FIG. 10 illustrates a NodeB receiver block diagram for the PUCCH structure in FIG. 8.

Referring to FIG. 10, after an antenna receives the analog signal and further processing, a digital signal 1010 is filtered by filter 1020 and the CP is removed by CP remover 1030. Subsequently, an FFT 1040 applies FFT, a controller 1055 selects the REs used by the UE transmitter and the sub-carrier demapper 1050 demaps the REs according to the control signal from the controller 1055. IDFT 1060 applies an IDFT, a multiplier 1070 multiples the output from the IDFT 1060 with an OCC element 1075 for the respective DFT-S-OFDM symbol, an adder 1080 sums the outputs for the DFT-S-OFDM symbols conveying HARQ-ACK signals over each slot, and a demodulator/decoder 1090 demodulates and decodes the summed HARQ-ACK signals over both sub-frame slots to obtain the transmitted HARQ-ACK bits 1095. Well known receiver functionalities such as channel estimation, demodulation, and decoding are not shown for brevity.

Although the PUCCH structure illustrated in FIG. 8 can support HARQ-ACK payloads larger than a few bits, it still requires large PUCCH overhead as HARQ-ACK signal transmissions from at most 5 UEs (as determined by the OCC length) can be accommodated per PRB. Unlike the PUCCH structure illustrated in FIG. 1, the HARQ-ACK signal transmission resource for the PUCCH structure illustrated in FIG. 8 cannot be implicitly determined from PDCCH CCEs and is configured for each UE through RRC signaling. As most UEs do not usually have HARQ-ACK signal transmission in a sub-frame, if the provisioned PUCCH resources accommodate a unique resource for each UE, the resulting overhead can be substantial, as unused resources cannot typically be utilized for other transmissions, resulting in BW waste.

Instead of having separate HARQ-ACK resources for each UE, HARQ-ACK resource compression may be applied to reduce PUCCH overhead in a UL PCC. However, even though HARQ-ACK resource compression reduces the probability of resource waste, NodeB scheduler restrictions are required as collisions of HARQ-ACK resources should be avoided for UEs with shared HARQ-ACK resources.

Therefore, there is a need to reduce the PUCCH resources for HARQ-ACK signal transmissions in response to DL SAs received in multiple DL CCs or multiple DL sub-frames.

There is another need to avoid collisions for HARQ-ACK signal transmissions from multiple UEs that share the same set of PUCCH resources without imposing strict NodeB scheduler restrictions.

Finally, there is another need to determine rules for assigning PUCCH resources for HARQ-ACK signal transmissions from UEs.

SUMMARY OF THE INVENTION

Accordingly, the present invention has been designed to solve at least the aforementioned limitations and problems in the prior art and provide at least the advantages described below.

An aspect of the present invention is to provide methods and apparatus for a UE to transmit an HARQ-ACK signal in a UL CC, in response to the reception of multiple DL SAs transmitted by a NodeB in multiple DL CCs or multiple DL sub-frames. The UL CC and a first DL CC establish the communication link when the UE is configured communication over a single UL CC and a single DL CC.

In accordance with an aspect of the present invention, the UE determines a first set of resources for the HARQ-ACK signal transmission in the PUCCH, when all DL SAs are received in the first DL CC, and determines a second set of resources for the HARQ-ACK signal transmission in the PUCCH, when at least one DL SA is received in a DL CC other than the first DL CC.

In accordance with another aspect of the present invention, the UE determines a resource for an HARQ-ACK signal transmission in a PUCCH using a Downlink Assignment Index (DAI) Information Element (IE) included in each DL SA for indicating a DL SA number and a Transmission Power Control (TPC) IE included in each DL SA for adjusting the acknowledgement signal transmission power. The role of these IEs is reinterpreted so that the power adjustment for the HARQ-ACK signal transmission is determined from the TPC IE value in the DL SA associated with the first DL CC having DAI IE value equal to one and the resource for the HARQ-ACK signal transmission is determined from the TPC IE value in each DL SA associated with the first DL CC having DAI IE value larger than one and from the TPC IE value in each DL SA associated with a DL CC other than the first DL CC.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will be described in more detail below with reference to the accompanying drawings. The present invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described for a communication system using DFT-S-OFDM or Single-Carrier Frequency Division Multiple Access (SC-FDMA) transmission, it also generally applicable to other Frequency Division Multiplexing (FDM) transmissions including OFDM.

Methods and apparatuses are described for a UE to determine the PUCCH resource for HARQ-ACK signal transmission, in response to multiple DL SA receptions in multiple DL CCs or in multiple DL sub-frames.

Figure 1:
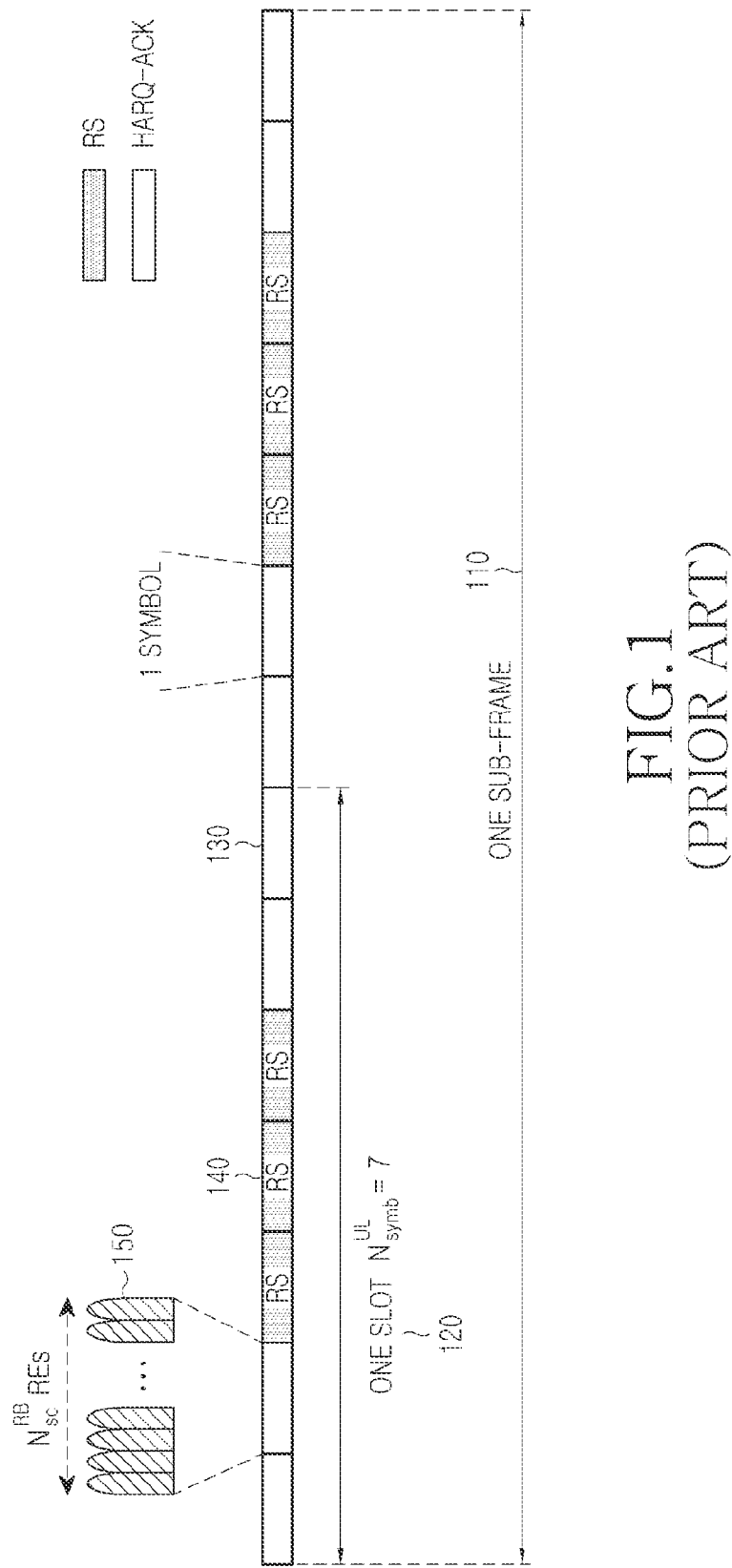
FIG. 1 is a diagram illustrating a conventional PUCCH sub-frame structure for an HARQ-ACK signal transmission.
Figure 2:
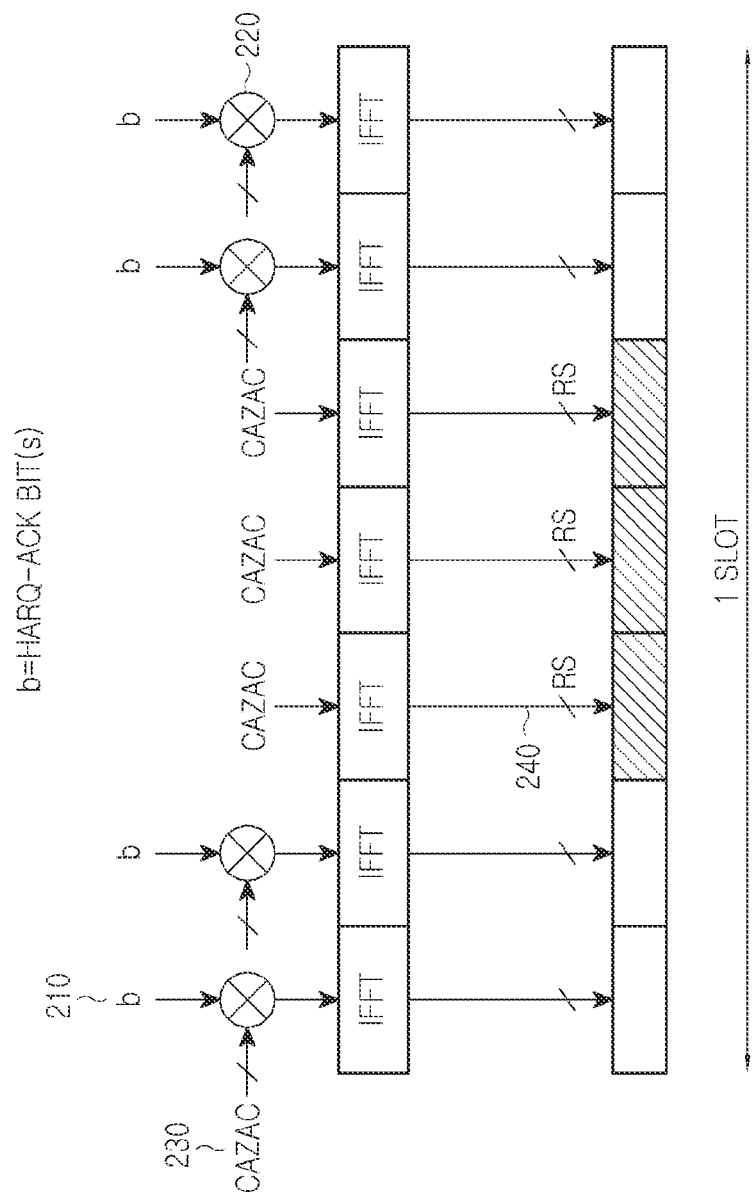
FIG. 2 is a diagram illustrating an HARQ-ACK signal transmission in a sub-frame slot for a PUCCH structure as illustrated in FIG. 1.
Figure 8:
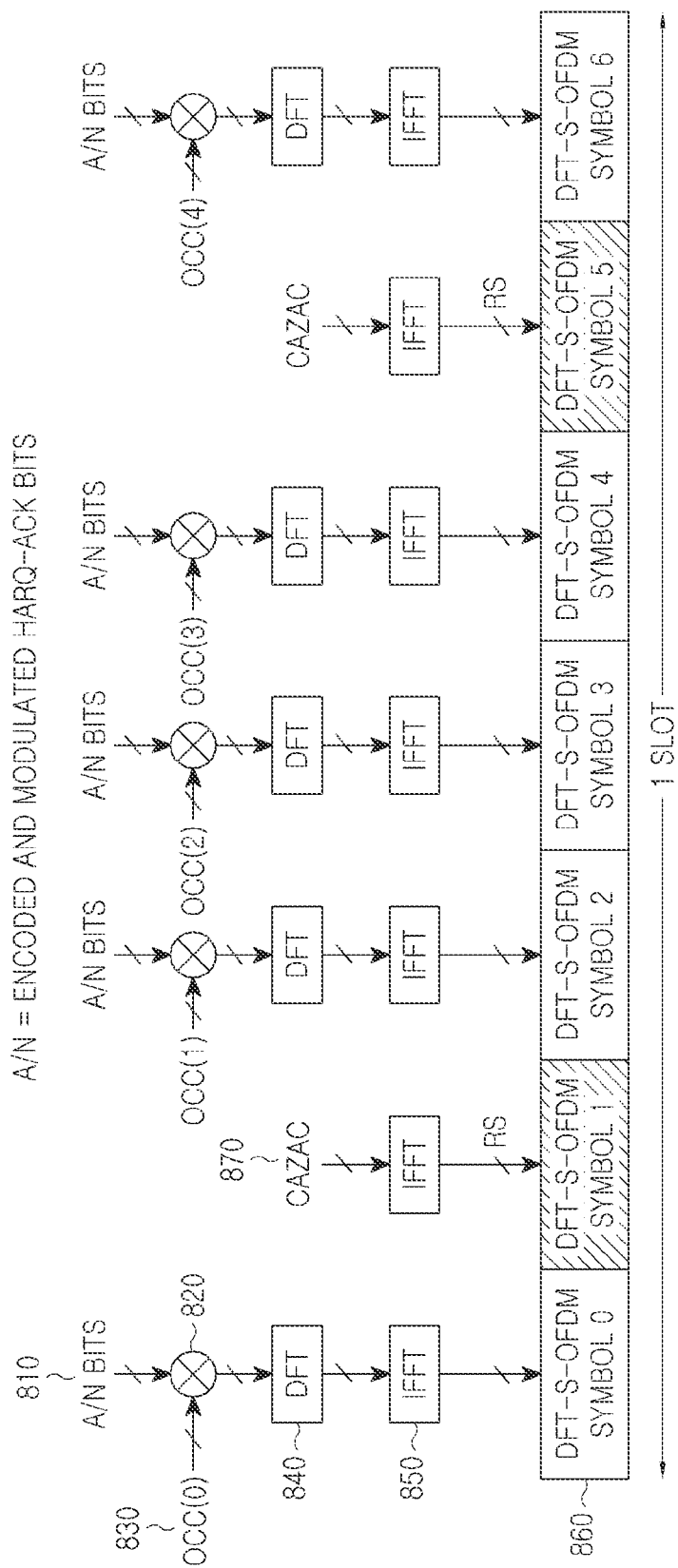
FIG. 8 is a diagram illustrating a conventional PUCCH structure in one sub-frame slot using DFT Spread OFDM for the HARQ-ACK signal transmission.

In accordance with an embodiment of the present invention, PUCCH resources are indexed for HARQ-ACK signal transmission in a UL PCC (herein referred to as HARQ-ACK resources). The HARQ-ACK resources may be RRC-configured to a UE (for example, using the PUCCH structure as illustrated in FIG. 8) or may be dynamically determined by a UE using the indexes of the CCEs for the respective DL SAs (for example, using the PUCCH structure as illustrated in FIG. 1).

Herein, the HARQ-ACK signal transmission in the PUCCH is assumed to be based on the following two principles:
1. A single UE-specific UL CC (UL PCC) is RRC-configured for the HARQ-ACK transmission in the PUCCH for a UE configured multiple DL CCs.
2. For a UE configured single UL/DL carrier-pair operation in FDD and receiving a DL SA in a single DL sub-frame in the DL PCC in TDD, the HARQ-ACK resource is implicitly derived from the CCEs of the respective DL SA, as it was previously described.

RRC-configured CCs can be activated or deactivated, for example by medium access control signaling. Herein, activation of a DL (or UL) CC means that the UE can receive PDSCH (or transmit PUSCH) in that CC. Similarly, the reverse applies for deactivation of a DL (or UL) CC. To maintain communication, one DL CC remains activated and is referred to as a DL Primary CC (DL PCC). The remaining DL CCs are referred to as DL Secondary CCs (DL SCCs). The DL PCC is assumed to be linked to the UL PCC and both are UE-specific.

For HARQ-ACK resource mapping in the UL PCC, the following two cases exist for a UE having communication in multiple DL CCs:
1. All DL SAs scheduling PDSCH in the multiple DL CCs are transmitted in the DL PCC.
   For example, in heterogeneous network operation with 2 DL CCs and 2 UL CCs.
2. Some DL SAs scheduling PDSCH in multiple DL CCs are not transmitted in the DL PCC.
   For example, parallelizing the nominal operation with a single UL/DL carrier pair.

Using a PUCCH structure as illustrated in FIG. 1, in accordance with an embodiment of the present invention, HARQ-ACK resource mapping depends on whether the first or the second of the previous two cases applies. For the first case, HARQ-ACK resource mapping rules used for a FDD system with a single DL/UL CC pair are generalized and expanded. For the second case, the HARQ-ACK resource mapping rules used for a TDD system with a single UL/DL CC pair are generalized and expanded, subject to additional conditions.

For the first case (all DL SAs are transmitted in the DL PCC), assuming that a UE receives M DL SAs for respective PDSCH receptions in M DL CCs, and denoting the first CCE for each of the M DL SAs as $n_{CCE}(m)$, n=0, 1 ..., M–1, the resource available for the HARQ-ACK signal transmission in response to PDSCH reception in DL CC m is determined as shown in Equation (1).

$$n_{PUCCH}(m) = n_{CCE}(m) + N_{PUCCH}, \quad m=0,1,\ldots,M-1 \qquad (1)$$

Figure 11:
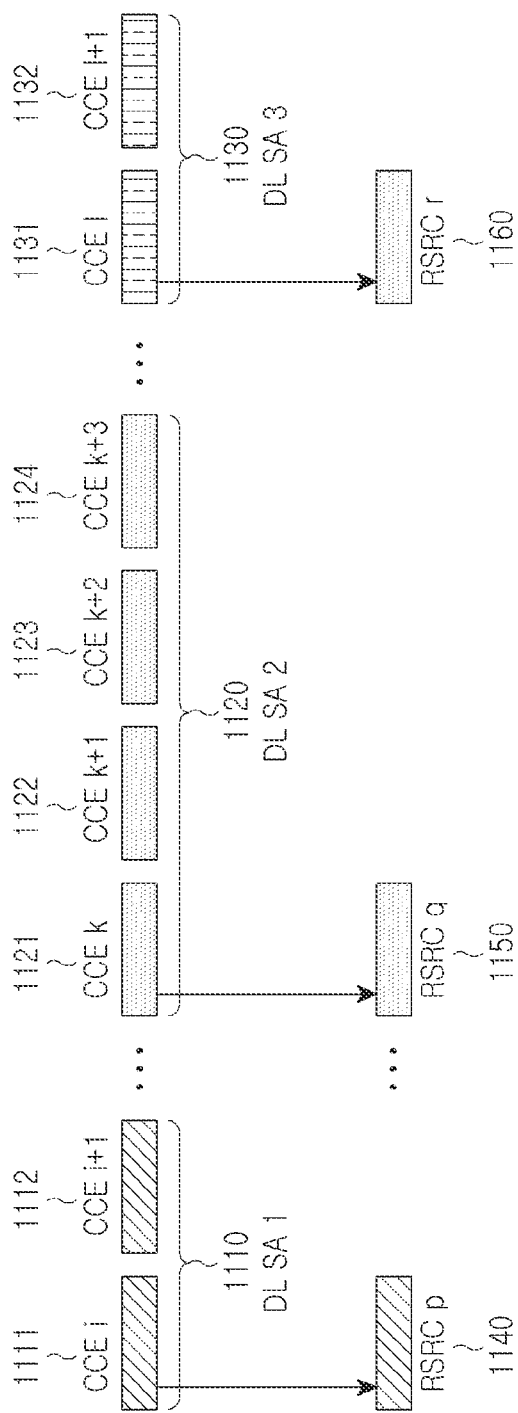
FIG. 11 is a diagram illustrating a transmission of 3 DL SAs in a DL PCC and a mapping of the respective 3 resources available for a transmission of an HARQ-ACK signal, according to an embodiment of the present invention.

FIG. 11 illustrates a transmission of three DL SAs in a DL PCC of a UE and mapping three respective HARQ-ACK resources.

Referring to FIG. 11, DL SA 1 1110 includes 2 CCEs 1111 and 1112, where the first CCE 1111 maps to a first HARQ-ACK resource (RSRC) 1140. DL SA 2 1120 includes 4 CCEs 1121, 1122, 1123, and 1124, where the first CCE 1121 maps to a second HARQ-ACK resource (RSRC) 1150. DL SA 3 1130 includes 2 CCEs 1131 and 1132, where the first CCE 1131 maps to a third HARQ-ACK resource (RSRC) 1160.

For the second case (some DL SAs to a UE are not transmitted in the DL PCC), there is a restriction that UEs having the same DL PCC are activated (and deactivated) DL SCCs in the same order which is configured by RRC signaling.

Figure 12:
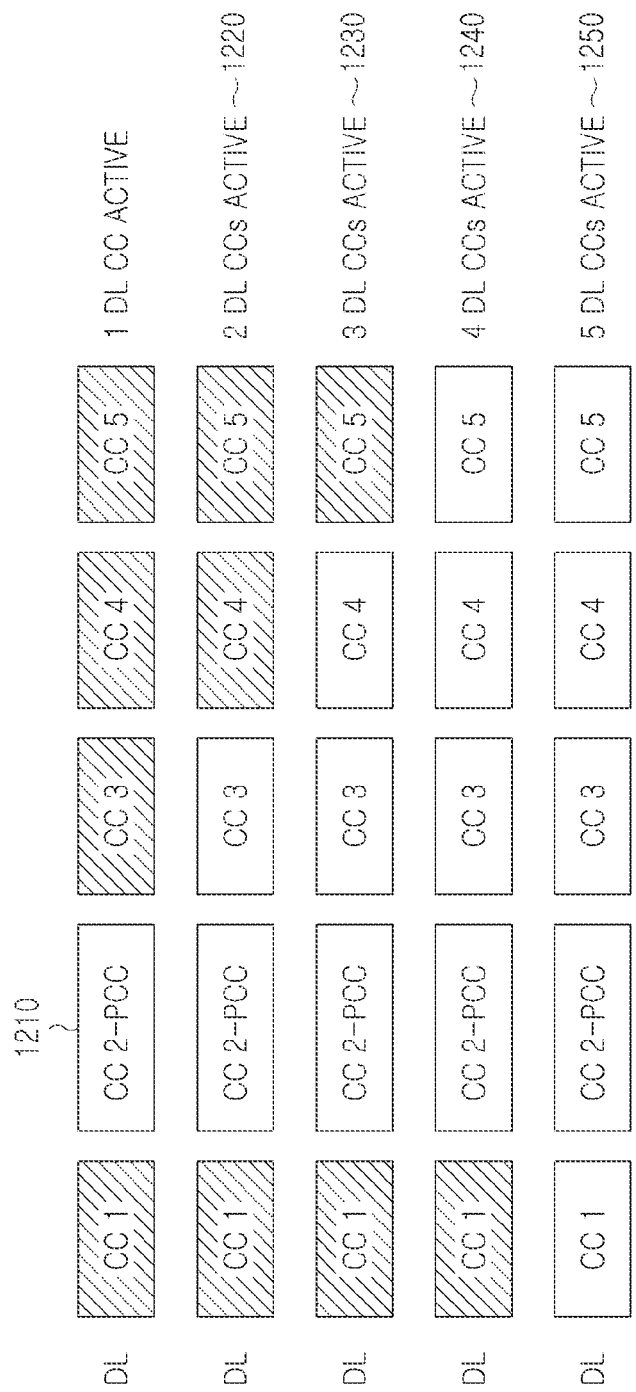
FIG. 12 is a diagram illustrating a restriction that UEs having a same DL PCC are activated (and deactivated) DL SCCs in a same order, according to an embodiment of the present invention.

FIG. 12 is a diagram illustrating a restriction that UEs having a same DL PCC are activated (and deactivated) DL SCCs in a same order, according to an embodiment of the present invention.

Referring to FIG. 12, UEs with DL CC2 1210 as a DL PCC are activated (and deactivated) DL SCCs in the same order, for example, starting with DL CC3 1220, and then continuing with DL CC4 1230, DL CC5 1240, and DL CC1 1250. UEs having DL CC 2 as DL PCC can have a different number of activated DL SCCs. Then, as a UE decodes the PCFICH in its activated DL CCs, it can identify the corresponding reserved HARQ-ACK resources from the PDCCH size. This restriction applies only for DL SCCs having PDCCH transmissions.

Figure 13:
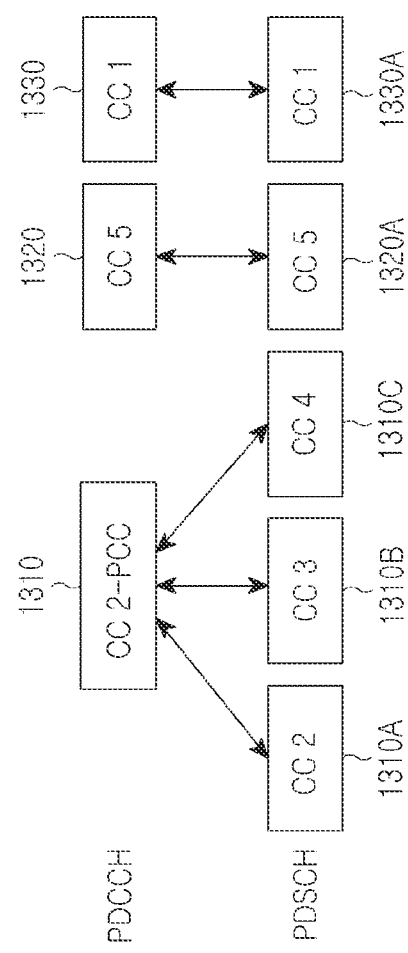
FIG. 13 is a diagram illustrating an ordering of activation and deactivation for 5 DL CCs depending on the DL CC used for the transmission of the respective DL SAs, according to an embodiment of the present invention.

FIG. 13 is a diagram illustrating an ordering of activation and deactivation for 5 DL CCs depending on the DL CC used for the transmission of the respective DL SAs, according to an embodiment of the present invention.

Referring to FIG. 13, for a reference UE, DL CC2 (DL PCC) 1310 conveys DL SAs for DL CC2 1310A, DL CC3 1310B, and DL CC4 1310C. DL CC5 1320 conveys DL SAs for DL CC5 1320A. DL CC1 1330 conveys DL SAs for DL CC1 1330A. Because scheduling in DL CC3 and DL CC4 is through DL SAs transmitted in DL CC2 (for example, an index in the DL SA can indicate the DL CC), DL CC3 and DL CC4 can be activated (and deactivated) in any order. However, this is not the case for DL CC5 and DL CC1, which are activated (and deactivated) in the same order for all UEs having DL CC2 as their DL PCC. Moreover, the HARQ-ACK signal transmissions in response to DL SA receptions in DL CC5 and DL CC1 is not in the UL CC(s) linked to these DL CCs, but are in the UL PCC (which linked to the DL PCC assumed to be DL CC2).

HARQ-ACK resource mapping will now be described below, assuming the previous restriction and considering for simplicity DL CCs of the same BW.

Herein, M is the number of activated DL SCCs for a UE with DL SA transmissions to that UE, m=0, 1, ..., M–1 is the index of the DL SCC in the set of M activated DL CCs, $N_p$ is the number of CCEs for a PCFICH value of p (where $N_0=0$), and $n_{CCE}(m)$ is the first CCE in the DL SA scheduling PDSCH in DL SCC m.

The UE first selects a value p∈{0, 1, 2, 3} that provides $N_p \le n_{CCE}(m) < N_{p+1}$ and uses Equation (2) as the HARQ-ACK resource corresponding to PDSCH in DL SCC m.

$$n_{PUCCH}(m) = (M-m-1) \times N_p + m \times N_{p+1} + n_{CCE}(m) + N_{PUCCH}, \quad m=0,\ldots,M-1 \qquad (2)$$

For DL SAs transmitted in the DL PCC, the HARQ-ACK resource mapping is as described in Equation (1).

For M=4 activated DL SCCs with DL SA transmission to a UE, with each DL SCC having maximum PDCCH size of 3 OFDM symbols, $N_{RB}^{DL}=100$ PRBs, $N_{sc}^{RB}=12$ REs, and 36 REs per CCE, the maximum number of CCEs in a PDCCH is 87 and the HARQ-ACK resource indexing corresponding to PDSCH reception in DL SCC m=0, 1, ..., M–1 is given in Table 2.

TABLE 2

| | HARQ-ACK resource in DL SCC m | | |
|---|---|---|---|
| | $n_{CCE} < 22$ | $22 \le n_{CCE} < 55$ | $55 \le n_{CCE} < 88$ |
| m = 0 | $n_{PUCCH}^{(1)} = n_{CCE} + N_{PUCCH}^{(1)}$ | $n_{PUCCH}^{(1)} = 66 + n_{CCE} + N_{PUCCH}^{(1)}$ | $n_{PUCCH}^{(1)} = 154 + n_{CCE} + N_{PUCCH}^{(1)}$ |
| m = 1 | $n_{PUCCH}^{(1)} = 22 + n_{CCE} + N_{PUCCH}^{(1)}$ | $n_{PUCCH}^{(1)} = 88 + n_{CCE} + N_{PUCCH}^{(1)}$ | $n_{PUCCH}^{(1)} = 187 + n_{CCE} + N_{PUCCH}^{(1)}$ |

TABLE 2-continued

HARQ-ACK resource in DL SCC m

| | $n_{CCE} < 22$ | $22 \le n_{CCE} < 55$ | $55 \le n_{CCE} < 88$ |
|---|---|---|---|
| m = 2 | $n_{PUCCH}^{(1)} = 44 + n_{CCE} + N_{PUCCH}^{(1)}$ | $n_{PUCCH}^{(1)} = 121 + n_{CCE} + N_{PUCCH}^{(1)}$ | $n_{PUCCH}^{(1)} = 220 + n_{CCE} + N_{PUCCH}^{(1)}$ |
| m = 3 | $n_{PUCCH}^{(1)} = 66 + n_{CCE} + N_{PUCCH}^{(1)}$ | $n_{PUCCH}^{(1)} = 154 + n_{CCE} + N_{PUCCH}^{(1)}$ | $n_{PUCCH}^{(1)} = 253 + n_{CCE} + N_{PUCCH}^{(1)}$ |

The previous HARQ-ACK resource mapping for multiple DL CCs follows the principles of HARQ-ACK resource mapping in TDD systems with a single DL/UL carrier. However, as no HARQ-ACK resource compression is used, the maximum number of HARQ-ACK resources in the UL PCC can be very large. For example, using Table 2 for the previous setup, the maximum HARQ-ACK resources in the UL PCC for M=5 DL CCs can be computed as $n_{PUCCH}=253+n_{CCE}+N_{PUCCH}$. Neglecting $N_{PUCCH}$, as it is only an offset, and assuming the maximum value of $n_{CCE}=87$ for $N_{RB}^{DL}=100$ PRBs, the maximum number of HARQ-ACK resources in the UL PCC is 253+87=340. Assuming a maximum multiplexing capacity of 18 HARQ-ACK channels per PRB, about 19 PRBs are used to accommodate HARQ-ACK transmissions in the PUCCH of the UL PCC. This represents 19% of the total UL PCC resources. Moreover, as the DL PCC is not considered to participate in the HARQ-ACK resource mapping for DL SCCs having DL SA transmission (for example, the DL PCC may also support UEs configured with a single DL/UL CC pair), NodeB scheduler restrictions are used to avoid collisions of HARQ-ACK resources.

To reduce the HARQ-ACK resources required to support communication over multiple DL CCs (for the second of the previous cases), in accordance with an embodiment of the present invention, for DL SAs scheduling PDSCH transmissions in DL SCCs, the NodeB scheduler can prioritize the placement of the first CCE to be within the first 22 CCEs (for the setup in Table 2). As the number of UEs scheduled in multiple DL CCs per sub-frame is typically small, the impact of this prioritization on the overall CCE availability is minor. Further, assuming that the CCEs are divided into CCEs that exist only in a UE-Common Search Space (UE-CSS) and CCEs that exist in a UE-Dedicated Search Space (UE-DSS), CCEs corresponding to the UE-CSS in DL SCCs can be omitted from the calculation of $n_{CCE}$. Then, a maximum of about 88+22=110 HARQ-ACK resources will be used and, with 18 HARQ-ACK channels per PRB, about 6 PRBs in the UL PCC suffice. This represents about 6% maximum overhead to support HARQ-ACK transmissions, for all UEs. Such an overhead is tolerable and comparable to the maximum overhead of about 5 PRBs when UEs are configured only a single DL/UL CC pair.

When HARQ-ACK resources (for the second of the previous cases) are configured by RRC signaling to a UE having communication over multiple DL CCs, additional HARQ-ACK resource overhead occurs due to the provision for the maximum HARQ-ACK resources for all UEs configured multiple DL CCs, regardless of whether these UEs are scheduled in a sub-frame. In peak conditions for DL CA support, the overhead due to HARQ-ACK resource allocation by RRC signaling may increase significantly while only modest increases can occur with dynamic HARQ-ACK resource allocation. HARQ-ACK resource sharing among multiple UEs can alleviate the increased overhead with HARQ-ACK resource allocation through RRC signaling, but such sharing imposes NodeB scheduler restrictions, as UEs sharing the same HARQ-ACK resource cannot have a DL SA in the same sub-frame.

In accordance with another embodiment of the present invention HARQ-ACK resource compression is enabled. For example, HARQ-ACK overhead reduction may be achieved through NodeB scheduler restrictions by placing the first CCE of the respective DL SAs for DL SCCs in the first 22 CCEs (for the previous example). The scheduler will also then ensure that no DL SA in the DL PCC has a first CCE given as $n_{CCE,1}=22 \cdot m+n_{CCE}(m)$, m=0, . . . , M−1.

Alternatively, the same resource mapping for all DL CCs can be used for the HARQ-ACK signal transmission in the UL PCC and $n_{PUCCH}(m)=N_{CCE}(m)+N_{PUCCH}$, m=0, 1, . . . , M−1. Thereafter, the scheduler then ensures that $n_{CCE}(m)$, m=0, 1, . . . , M−1 is different among all DL CCs where a UE receives DL SA.

To avoid having such constraints on the NodeB scheduler, an offset for the HARQ-ACK resource can be provided by the respective DL SA. The corresponding Information Element (IE) in the DL SA will be referred to as HARQ-ACK Resource Index (HRI) IE. Denoting the HRI IE value for DL SCC m as HRI(m), the HARQ-ACK resource corresponding to PDSCH in DL SCC m is obtained as $$n_{PUCCH}(m) = (M-m-1) \times N_p + m \times N_{p+1} + n_{CCE} + N_{PUCCH} + HRI(m), \quad m=0, \ldots, M-1 \quad (3)$$

For example, assuming that HRI IE consists of 2 bits, its interpretation can be as in Table 3.

TABLE 3

Mapping the HRI to an HARQ-ACK Resource Offset Value.

| HARQ-ACK Resource Index Field | Offset Value |
|---|---|
| 00 | 0 |
| 01 | −1 |
| 10 | 1 |
| 11 | 2 |

The HRI IE can also be used to avoid having the constraint that the first CCE the NodeB scheduler uses to transmit DL SAs in DL SCCs is within the first 22 CCEs (with or without accounting for CCEs allocated to the UE-CSS), that is $n_{CCE}(m) < 22$, m=0, . . . M−1. Instead, the CCE index associated with the HARQ-ACK resource can be defined using the modulo operation with respect to a maximum CCE index value, $N_{CCE}^{max}$, and $n_{PUCCH}(m)$ as shown in Equation (4).

$$n_{PUCCH}(m) = ((M-m-1) \times N_p + m \times N_{p+1} + n_{CCE}(m)) \bmod (N_{CCE}^{max}) + N_{PUCCH} + HRI(m), \quad m=0, \ldots, M-1 \quad (4)$$

The value of $N_{CCE}^{max}$ can be either signaled by the NodeB (RRC signaling or broadcast signaling) or be predefined. The modulo operation between two integers, x, y with y>0, is defined as x mod(y)=x−n·y, where n=⌊x/y⌋.

In general, the HARQ-ACK resource corresponding to the PDSCH in DL CC m can be determined as a function of the first CCE used for the respective DL SA and the value of the HRI IE as shown in Equation (5).

$$n_{PUCCH}(m) = f(n_{CCE}(m), HRI(m)), \quad m=0,1, \ldots, M-1 \quad (5)$$

For example, the HARQ-ACK resource in response to DL SA reception in DL CC m can be determined as shown in Equation (6).

$$n_{PUCCH}(m) = n_{CCE}(m) + HRI(m) + N_{PUCCH}, \quad m=0,1, \ldots, M-1 \quad (6)$$

To further alleviate HARQ-ACK resource collisions, a DL CC specific offset $N_{HARQ\text{-}ACK}(m)$, $m=0, 1, \ldots, M-1$ can be introduced, for example by RRC signaling, and $n_{PUCCH}(m)$, as shown in Equation (7).

$$n_{PUCCH}(m) = n_{CCE}(m) + HRI(m) + N_{HARQ\text{-}ACK}(m) + N_{PUCCH}, \quad m=0,1,\ldots,M-1 \quad (7)$$

Similarly, for the HARQ-ACK resource indexing in Equation (4), $n_{PUCCH}(m)$ can be determined, as shown in Equation (8).

$$n_{PUCCH}(m) = ((M-m-1) \times N_p + m \times N_{p+1} + n_{CCE}(m)) \bmod (N_{CCE}^{max}) + N_{PUCCH} + HRI(m) + N_{HARQ\text{-}ACK}(m), \quad m=0,\ldots,M-1 \quad (8)$$

The addition of an explicit HRI IE in the DL SAs can be avoided if an existing IE can be interpreted as providing the HRI. Assuming that DL SAs include a Downlink Assignment Index (DAI) IE that provides a count for the DL SA number, the DL SAs can be ordered.

For example, assuming that a UE can receive DL SAs in DL CC1, DL CC2, DL CC3, and DL CC4 and that the NodeB transmits DL SAs to the UE in DL CC1, DL CC2, and DL CC4, the DAI IE in the DL SAs can have a value of 1 for DL CC2, a value of 2 for DL CC4, and a value of 3 for DL CC1. Accordingly, the UE identifies that the DL SA in DL CC2 is ordered first, the DL SA in DL CC4 is ordered second, and the DL SA in DL CC 1 is ordered third. In a similar manner, for a TDD system with a single or multiple CCs and, for example, 4 DL sub-frames in the bundling window, the DAI IE can indicate whether the DL SA the UE receives in a sub-frame is the first, second, third, or fourth transmitted DL SA for the given CC.

DL SAs are also assumed to include a Transmission Power Control (TPC) IE providing TPC commands in order for the UE to adjust the HARQ-ACK signal transmission power. It is assumed herein that all DL SAs include the TPC IE. However, because the HARQ-ACK signal transmission is only in the UL PCC, a single TPC command can suffice. In accordance with an embodiment of the present invention, a TPC command is provided by the TPC IE in the first DL SA, as determined by the DAI IE value. The TPC IEs in the remaining DL SAs can be used as HRI IEs.

Figure 14:
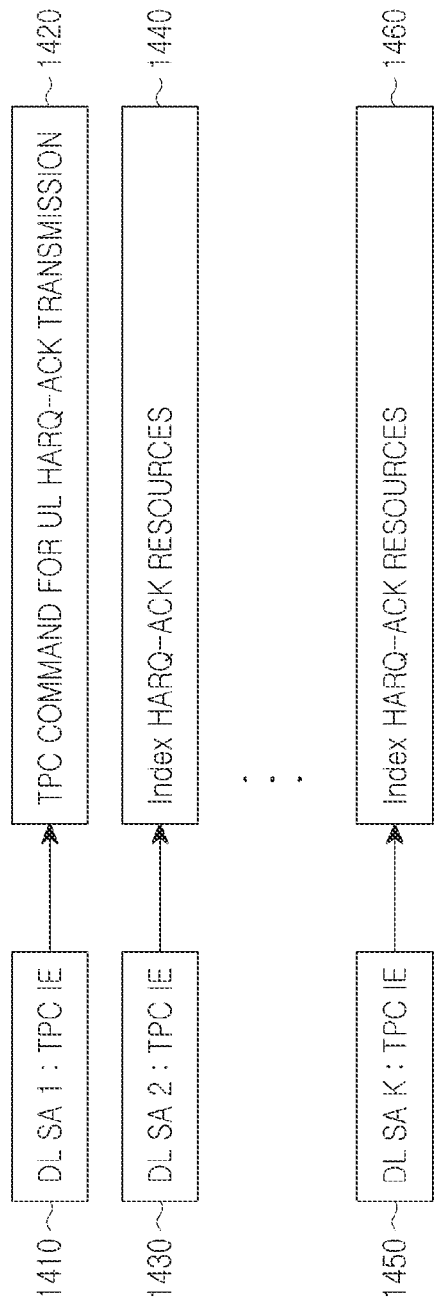
FIG. 14 is a diagram illustrating use of a TPC IE in a first ordered DL SA, as determined by a DAI IE value, to provide a TPC command for an HARQ-ACK signal transmission and use of a TPC IE in remaining DL SAs to provide an index for a respective resource for the HARQ-ACK signal transmission, according to an embodiment of the present invention.

FIG. 14 illustrates a principle of identifying and using the bits of an IE in the DL SAs to index the resources for the HARQ-ACK signal transmission according to an embodiment of the present invention. Although FIG. 14 considers the TPC IE, an explicit HRI IE may be used instead.

Referring to FIG. 14, a TPC IE in a first ordered DL SA 1410 (as determined by the DAI IE value) provides a TPC command for a HARQ-ACK signal transmission 1420 in response to reception of DL SAs. Each TPC IE in the remaining DL SA2 1430 through DL SA K 1450 is used as an index for HARQ-ACK resources 1440 through 1460, respectively.

Although dynamically indexed HARQ-ACK resources are considered, the HRI functionality is independent of how the HARQ-ACK resource is determined and serves to further index the HARQ-ACK resources in order to avoid collisions when resource compression is applied to the HARQ-ACK resource mapping. Moreover, the HRI functionality is applicable to either a PUCCH structure as illustrated in FIG. 1 or a PUCCH structure as illustrated in FIG. 8 and to further indexing either dynamically determined or RRC-configured HARQ-ACK resources.

If the first DL SA (with DAI=1) is missed by the UE, the TPC command for the HARQ-ACK transmission is missed and the UE does not perform a respective power adjustment. However, this is not expected to have a noticeable impact on the overall system operation as it is a low probability event, as UEs with DL CA have good link quality and DL SAs are unlikely to be missed, and the TPC adjustment is typically small. It is noted that if only the DL SA with DAI=1 is received by the UE (either in the DL PCC for FDD or in the first sub-frame of the DL PCC for TDD), the HARQ-ACK resource is implicitly derived from the CCEs of the respective DL SA (second principle for the HARQ-ACK signal transmission assumed by the invention).

Figure 3:
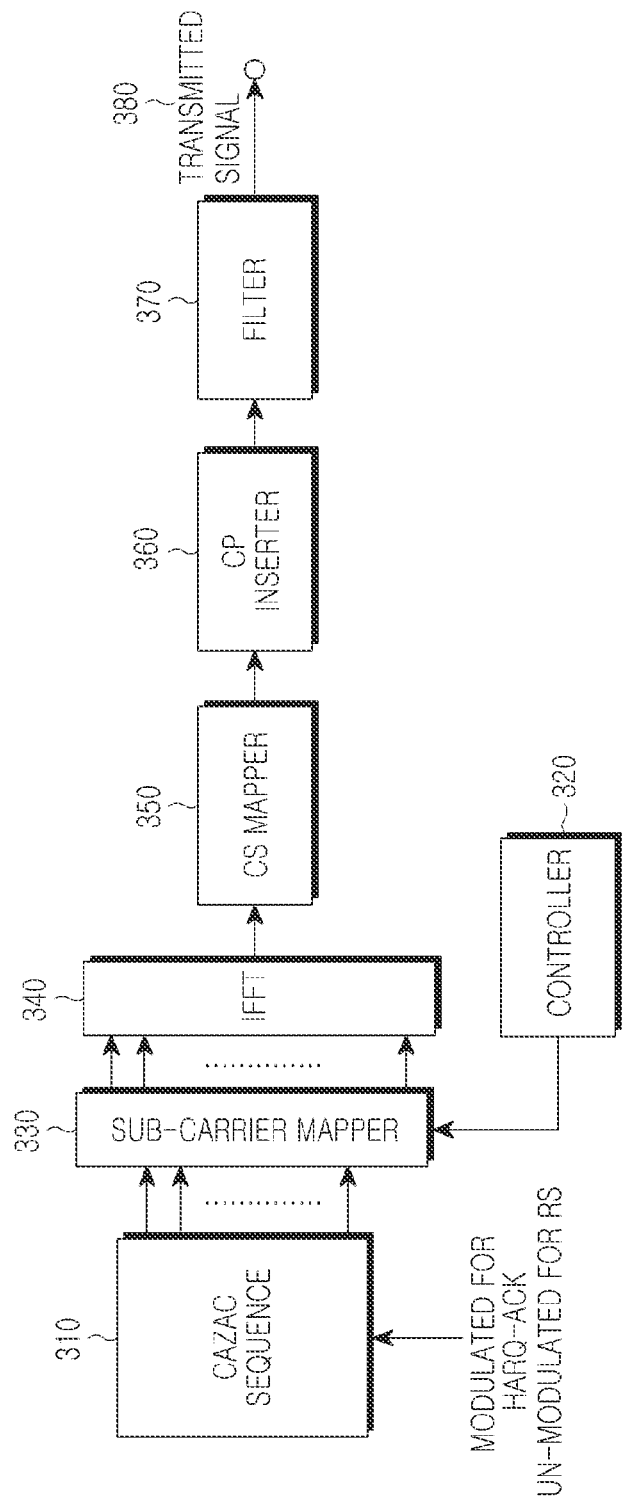
FIG. 3 is a block diagram illustrating a transmitter for a PUCCH structure as illustrated in FIG. 1.
Figure 9:
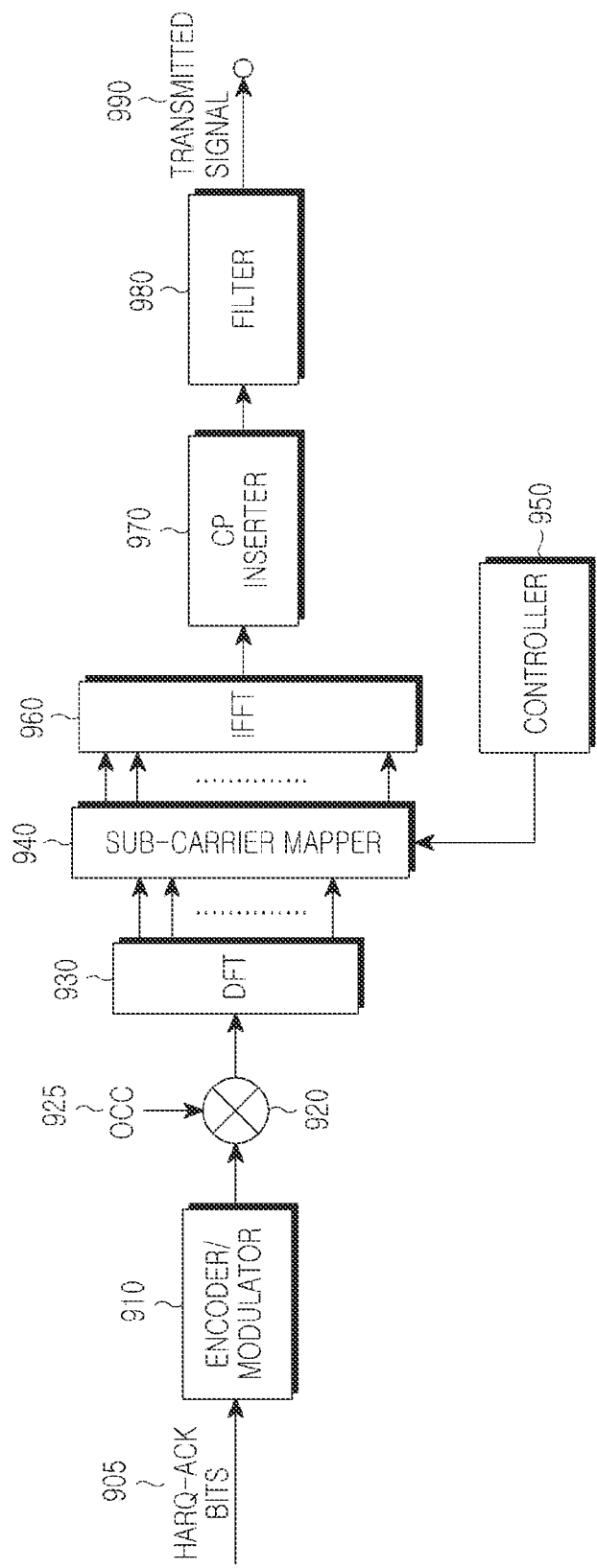
FIG. 9 is a block diagram illustrating a transmitter for a PUCCH structure as illustrated in FIG. 8.
Figure 15:
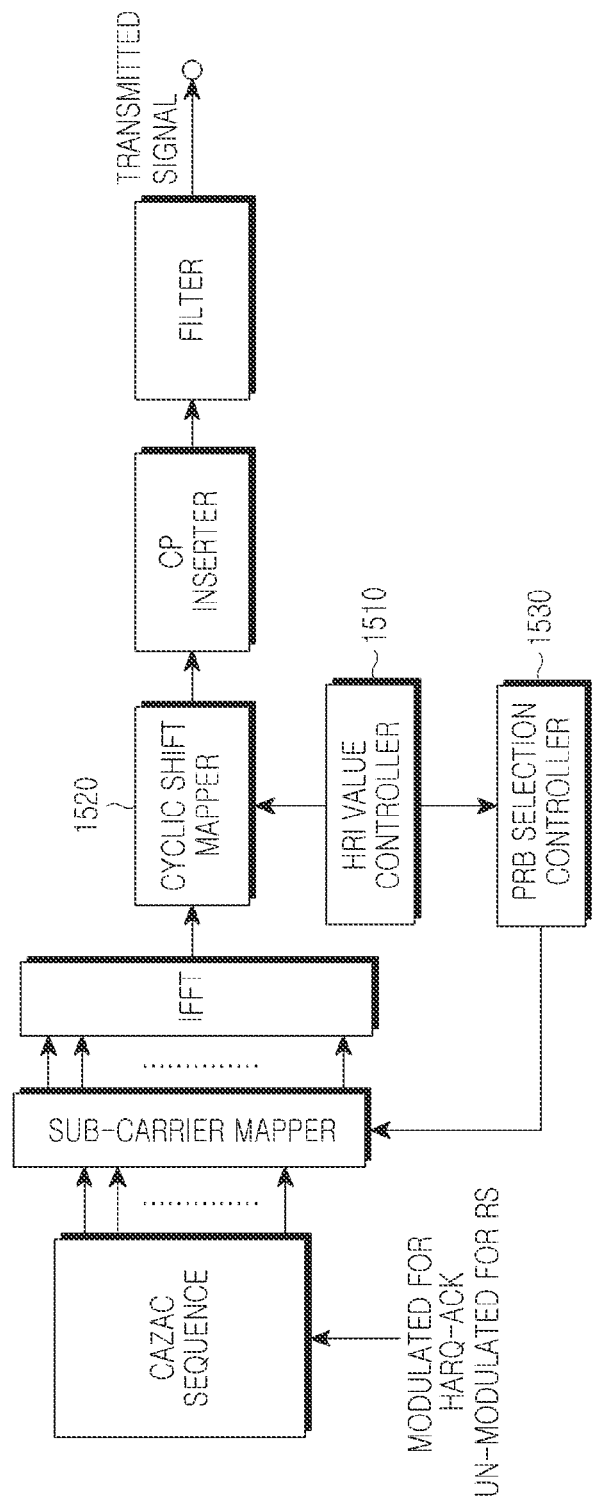
FIG. 15 is a block diagram illustrating a transmitter for a PUCCH structure where a resource for an HARQ-ACK signal transmission is indexed by a TPC IE value in a DL SA, other than a first ordered DL SA, as determined from a value of a DAI IE, according to an embodiment of the present invention.

FIG. 15 is a block diagram illustrating a transmitter for a HARQ-ACK signal in a PUCCH where a resource for the HARQ-ACK signal transmission (HARQ-ACK resource) is indexed by a TPC IE value in a DL SA, other than a first ordered DL SA, as determined from a value of a DAI IE, according to an embodiment of the present invention. In FIG. 15, the main components are the same as those illustrated in FIG. 3 and described above, with the exception that the HARQ-ACK resource depends on an offset specified by a HRI value controller 1510 for mapping the TPC IE (or of the HRI IE) value, which the UE obtains from the respective DL SAs (with DAI IE value larger than one in the DL PCC) and uses to derive the HARQ-ACK resource. The HARQ-ACK resource includes the CS which is applied by the CS mapper 1520 and the PRB which is determined by the PRB selection controller 1530 (and also the OCC—not shown for simplicity). The transmitter structure as illustrated in FIG. 9 may be modified in the same manner.

Figure 4:
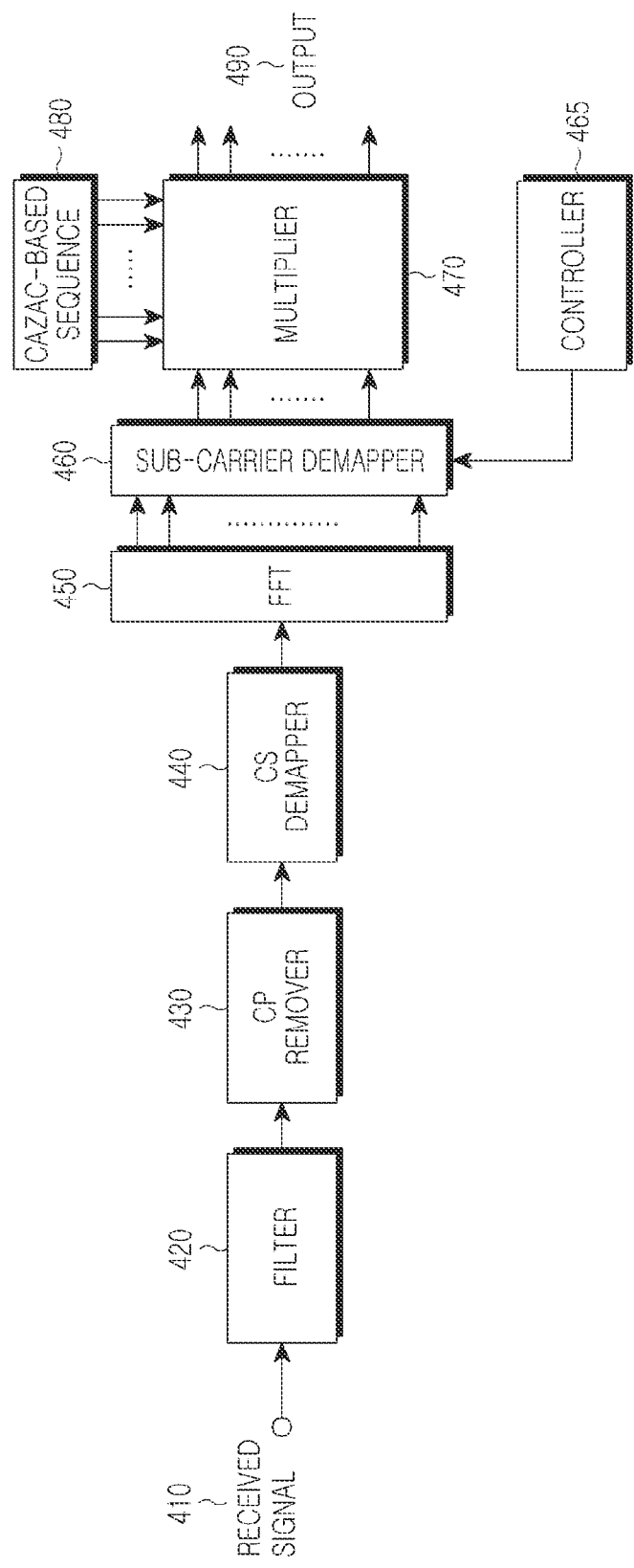
FIG. 4 is a block diagram illustrating a receiver for a PUCCH structure as illustrated in FIG. 1.
Figure 5:
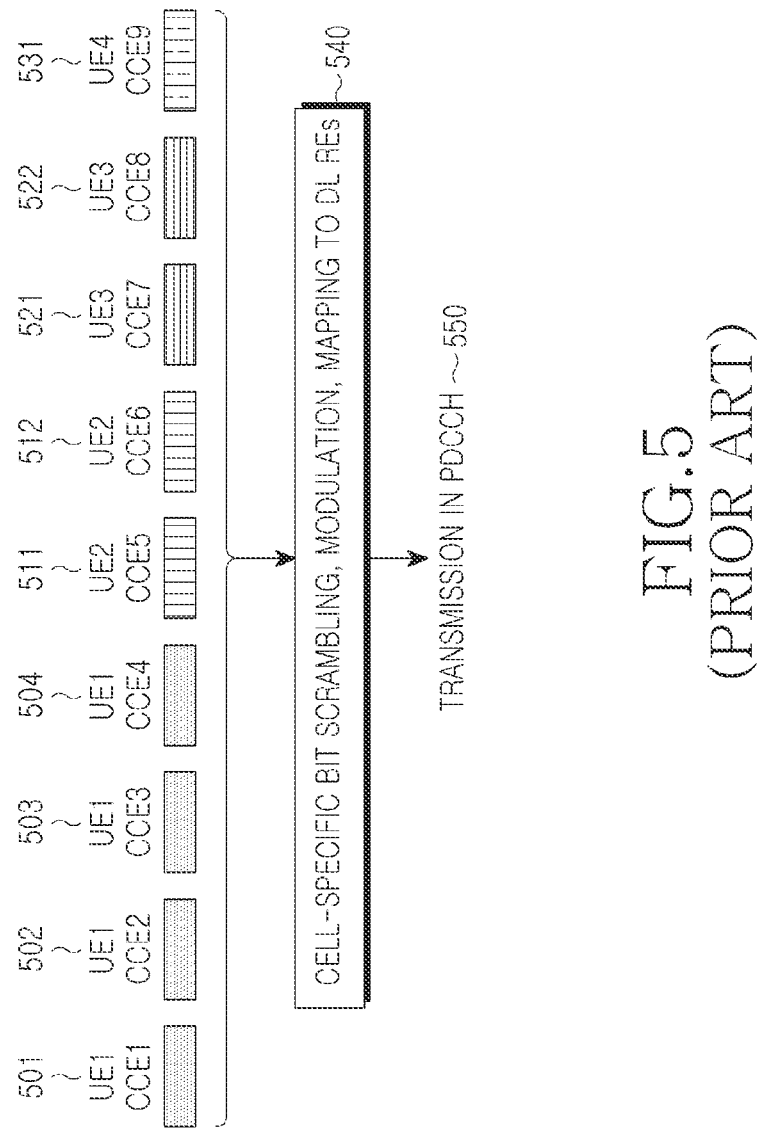
FIG. 5 is a diagram illustrating a transmission of a DL SA using CCEs in a PDCCH.
Figure 6:
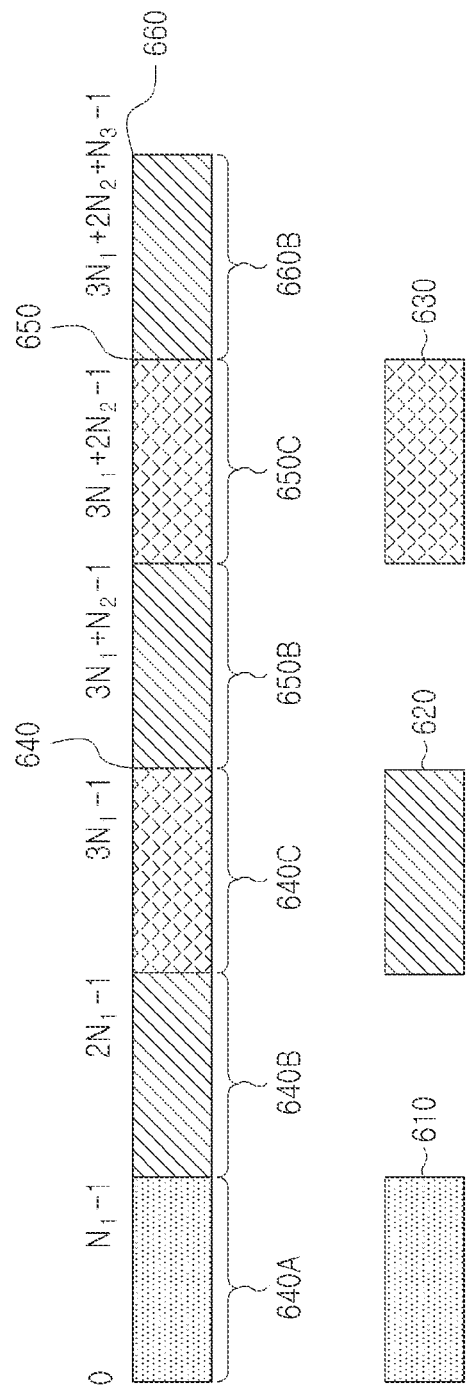
FIG. 6 is a diagram illustrating block interleaving of PUCCH resources assuming a Time Division Duplex system with 3 DL sub-frames in a bundling window.
Figure 7:
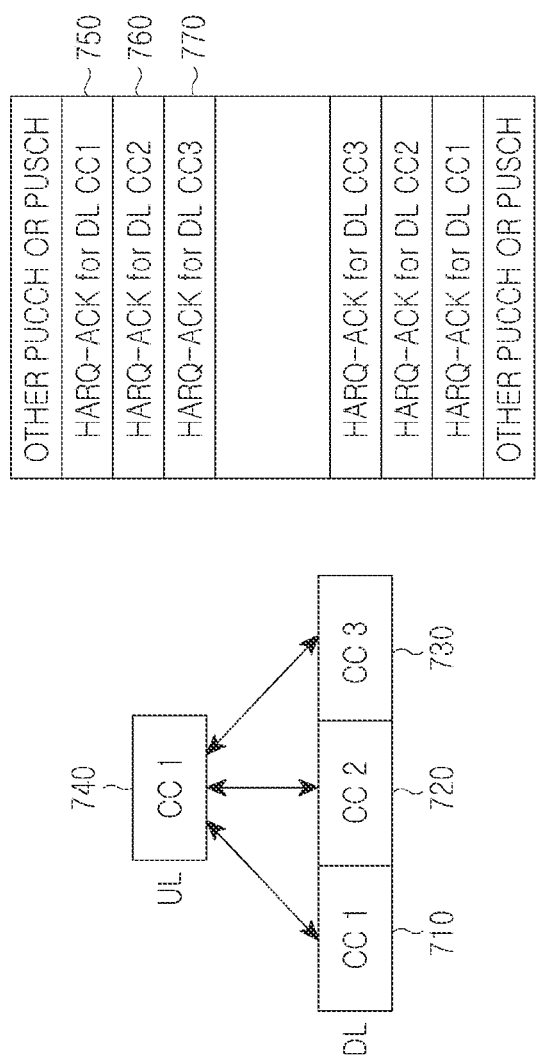
FIG. 7 is a diagram illustrating resource allocation in a UL CC for HARQ-ACK signal transmissions corresponding to DL SAs received in 3 DL CCs.
Figure 10:
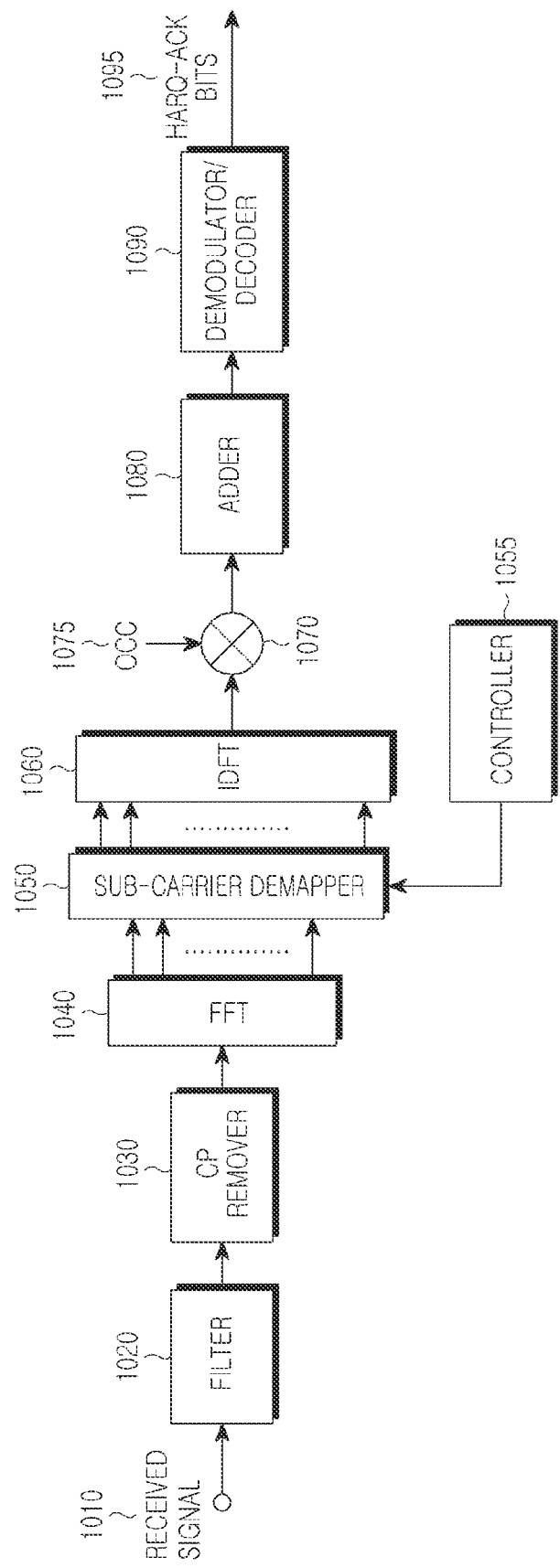
FIG. 10 is a block diagram illustrating a receiver for a PUCCH structure as illustrated in FIG. 8.
Figure 16:
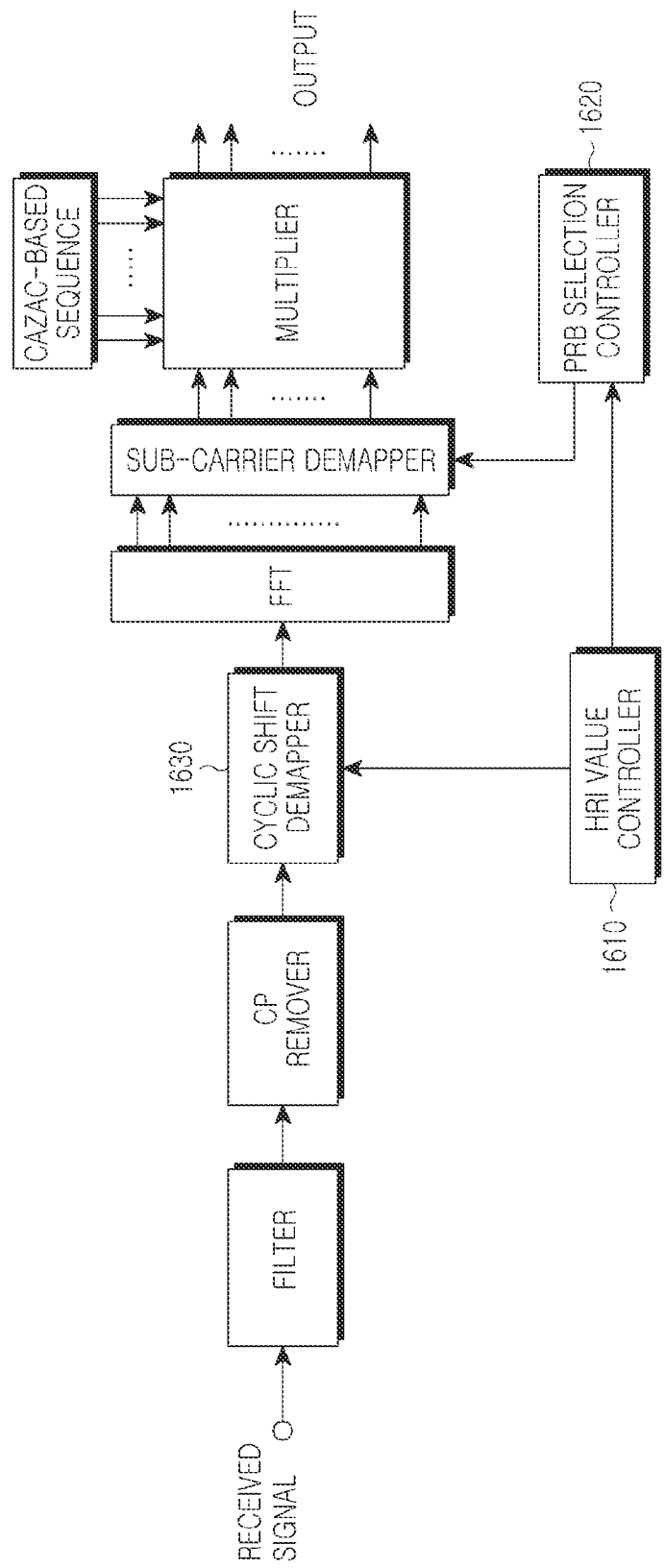
FIG. 16 is a block diagram illustrating a receiver for a PUCCH structure where a resource for an HARQ-ACK signal reception is indexed by a TPC IE value in a DL SA, other than a first ordered DL SA, as determined from a value of a DAI IE, according to an embodiment of the present invention.

FIG. 16 is a block diagram illustrating a receiver for a HARQ-ACK signal in a PUCCH where a resource for the HARQ-ACK signal reception (HARQ-ACK resource) is indexed by a TPC IE value in a DL SA, other than a first ordered DL SA, as determined from a value of a DAI IE, according to an embodiment of the present invention. In FIG. 16, the main components are the same as those illustrated in FIG. 4 and described above, with the exception that the HARQ-ACK resource depends on the offset specified by the HRI value controller 1610 for the mapping of the TPC IE (or of the HRI IE) value, which the NodeB included in the respective DL SA. The resource includes the CS which is applied by the CS demapper 1630 and the PRB which is determined by PRB selection controller 1620 (and also the OCC—not shown for simplicity). The receiver structure as illustrated in FIG. 10 may also modified in the same manner.

Figure 17:
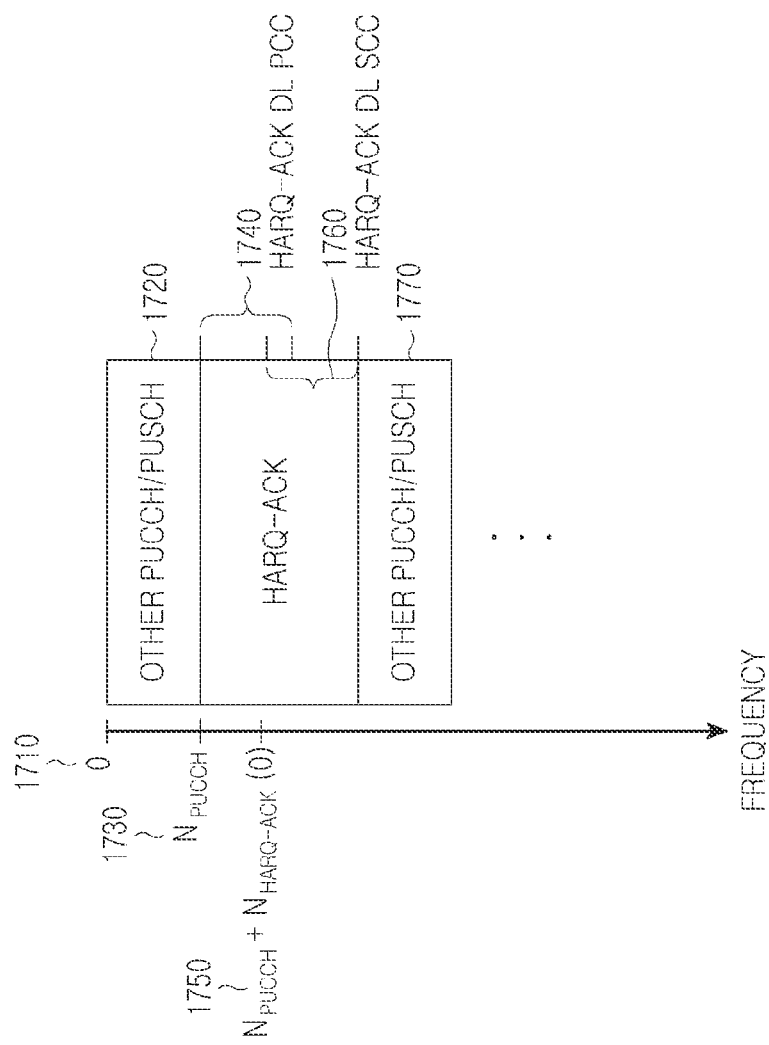
FIG. 17 is a diagram illustrating a resource mapping for an HARQ-ACK signal transmission for 2 DL CCs, each transmitting its own DL SA, using a DL CC specific offset, according to an embodiment of the present invention.

FIG. 17 is a diagram illustrating a resource mapping for an HARQ-ACK signal transmission for 2 DL CCs, each transmitting its own DL SA, using a DL CC specific offset, according to an embodiment of the present invention.

Referring to FIG. 17, an outer BW region, starting from PRB 0 1710, is used for PUSCH transmissions and PUCCH transmissions other than dynamic HARQ-ACK transmissions 1720 (dynamic HARQ-ACK transmissions are in response to receptions of DL SAs). After $N_{PUCCH}$ HARQ-ACK resources 1730, corresponding, for example, to $N_{PUCCH}/18$ PRBs (assuming 18 HARQ-ACK channels per PRB), the HARQ-ACK resources in response to DL SAs in the DL PCC are mapped 1740. After $N_{PUCCH} + N_{HARQ\text{-}ACK}(0)$ HARQ-ACK resources 1750, corresponding, for example, to $(N_{PUCCH} + N_{HARQ\text{-}ACK}(0))/18$ PRBs, the HARQ-ACK resources in response to DL SAs in the DL SCC are mapped 1760. The HARQ-ACK resources for DL SAs in the DL PCC and for DL SAs in the DL SCC may partially or completely overlap (for example, complete overlapping occurs for $n_{CCE}(m) = n_{CCE}$ and $N_{HARQ\text{-}ACK}(m) = 0$ in Equation (7)). Finally, resources allocated to other PUCCH or PUSCH transmission follow 1770. The same mapping can apply from the other end of the BW (although not shown for brevity).

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting an acknowledgement signal at a user equipment (UE) in a wireless communication system, the method comprising:
   receiving first control information on a first downlink component carrier (DL CC), the first control information including a first downlink assignment index (DAI) and a first transmission power command (TPC);
   determining a resource for a transmission of the acknowledgement signal based on a value of the first TPC in the first control information if a value of the first DAI is greater than a predetermined value; and
   transmitting the acknowledgement signal on the resource.

2. The method of claim 1, wherein the predetermined value is one.

3. The method of claim 1, further comprising:
   receiving second control information on a second DL CC, the second control information including a second DAI and a second TPC,
   wherein a value of the second TPC is used for determining the resource for the transmission of the acknowledgement signal regardless of a value of the second DAI.

4. The method of claim 3, wherein the value of the first TPC and the value of the second TPC are identical if the value of the first DAI is greater than the predetermined value.

5. The method of claim 3, wherein the value of the first DAI and the value of the second DAI respectively indicate a number of subframes with downlink transmission.

6. A user equipment (UE) for transmitting an acknowledgement signal in a wireless communication system, the UE comprising:
   a receiver that receives first control information on a first downlink component carrier (DL CC), the first control information including a first downlink assignment index (DAI) and a first transmission power command (TPC);
   a controller that determines a resource for a transmission of the acknowledgement signal based on a value of the first TPC in the first control information if a value of the first DAI is greater than a predetermined value; and
   a transmitter that transmits the acknowledgement signal on the resource.

7. The UE of claim 6, wherein the predetermined value is one.

8. The UE of claim 6, wherein the receiver further receives second control information on a second DL CC, the second control information including a second DAI and a second TPC, and
   wherein a value of the second TPC is used for determining the resource for the transmission of the acknowledgement signal regardless of a value of the second DAI.

9. The UE of claim 8, wherein the value of the first TPC and the value of the second TPC are identical if the value of the first DAI is greater than the predetermined value.

10. The UE of claim 8, wherein the value of the first DAI and the value of the second DAI respectively indicate a number of subframes with downlink transmission.

11. A method for receiving an acknowledgement signal at a base station (BS) in a wireless communication system, the method comprising:
   transmitting first control information on a first downlink component carrier (DL CC) to a user equipment (UE), the first control information including a first downlink assignment index (DAI) and a first transmission power command (TPC); and
   receiving the acknowledgement signal on a resource for a transmission of the acknowledgement signal from the UE,
   wherein the resource is determined, by the UE, based on a value of the first TPC in the first control information if a value of the first DAI is greater than a predetermined value.

12. The method of claim 11, wherein the predetermined value is one.

13. The method of claim 11, further comprising:
   transmitting second control information on a second DL CC to the UE, the second control information including a second DAI and a second TPC,
   wherein a value of the second TPC is used for determining the resource for the transmission of the acknowledgement signal regardless of a value of the second DAI.

14. The method of claim 13, wherein the value of the first TPC and the value of the second TPC are identical if the value of the first DAI is greater than the predetermined value.

15. The method of claim 13, wherein the value of the first DAI and the value of the second DAI respectively indicate a number of subframes with downlink transmission.

16. A base station (BS) for receiving an acknowledgement signal in a wireless communication system, the BS comprising:
   a transceiver that transmits first control information on a first downlink component carrier(DL CC) to a user equipment(UE), the first control information including a first downlink assignment index (DAI) and a first transmission power command (TPC) and receives the acknowledgement signal on a resource for a transmission of the acknowledgement signal from the UE,
   wherein the resource is determined, by the UE, based on a value of the first TPC in the first control information if a value of the first DAI is greater than a predetermined value.

17. The BS of claim 16, wherein the predetermined value is one.

18. The BS of claim 16,
   wherein the transceiver further transmits second control information on a second DL CC to the UE, the second control information including a second DAI and a second TPC, and
   wherein a value of the second TPC is used for determining the resource for the transmission of the acknowledgement signal regardless of a value of second DAI.

19. The BS of claim 18, wherein the value of the first TPC and the value of the second TPC are identical if the value of the first DAI is greater than the predetermined value.

20. The BS of claim 18, wherein the value of the first DAI and the value of the second DAI respectively indicate a number of subframes with downlink transmission.

* * * * *